INVENTORS
CLARE D. McGILLEM
MYRTON N. JONES
BY RICHARD G. ERWOOD

INVENTORS
CLARE D. McGILLEM
MYRTON N. JONES
BY RICHARD G. ERWOOD
ATTYS.

Feb. 19, 1963   C. D. McGILLEM ET AL   3,078,453
RADAR SYSTEM FOR DISTINGUISHING CLOSELY SPACED TARGETS
Filed May 13, 1955                             3 Sheets-Sheet 3

INVENTORS
CLARE D. McGILLEM
MYRTON N. JONES
BY RICHARD G. ERWOOD
ATTYS.

United States Patent Office 3,078,453
Patented Feb. 19, 1963

3,078,453
RADAR SYSTEM FOR DISTINGUISHING
CLOSELY SPACED TARGETS
Clare D. McGillem, Indianapolis, Ind., Myrton N. Jones, Glen Burnie, Md., and Richard G. Erwood, Indianapolis, Ind., assignors to the United States of America as represented by the Secretary of the Navy
Filed May 13, 1955, Ser. No. 508,334
11 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

This invention relates to radar and is particularly directed to means for improving the resolving power of the directional beam of the radar. More specifically, this invention relates to means for enabling radar to distinguish between closely spaced targets.

The problems involved in separating on an indicator screen, or in signal circuits, the video signals received from two closely spaced targets is quite different from the problem of obtaining high resolving power in the radar to angularly locate a single target. The reason for the complexity of the problem of distinguishing between targets lies in the fact that the video signal received from each target is of random phase and amplitude and there is no known direct method of separating the several signals. When the targets are represented as light spots on the screen of a cathode ray tube in conventional PPI presentation, the separate targets are distinctly shown until they approach the beamwidth of the transmitted lobe and then a false target appears midway between the two targets and the viewer then sees one elongated streak of light. When the operator is the pilot of an interceptor and must select a single target to attack, such a presentation is of course confusing and has been found to defeat the purpose of the interceptor.

The object of this invention is to eliminate false targets on radar presentation screens and to clearly define even closely spaced targets.

Discussion of the prior art and description of the basic principles of this invention will more readily follow a description of the specific embodiment of the invention shown in the accompanying drawings in which.

Figure 1:
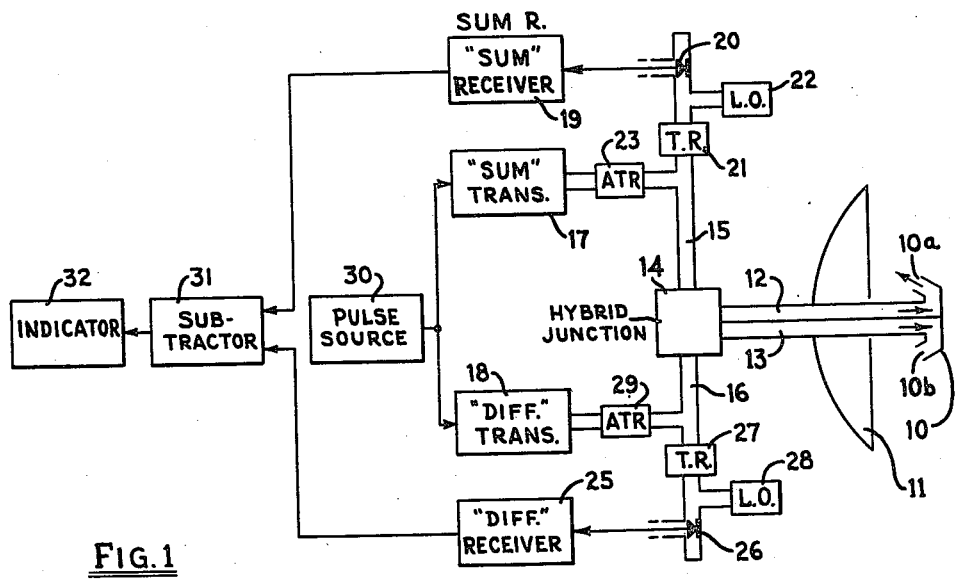
FIG. 1 is a block diagram of one radar embodying this invention.
Figure 2:
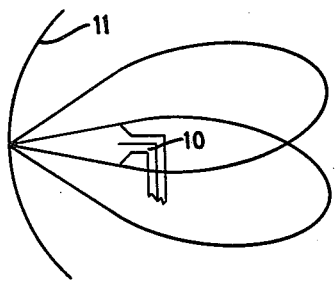
FIG. 2 is a diagram of the radiation pattern of the antenna of FIG. 1.

In FIG. 1 is shown an antenna structure 10 and its parabolic reflector 11. Microwave energy is directed to the concave surface of the reflector from two horns or radiators 10a and 10b each displaced symmetrically on opposite sides of the centerline of the reflector. Accordingly, the lobes of the energy pattern from the two horns are displaced from each other but slightly overlapping as shown in FIG. 2. The lobes represented in FIG. 2 indicate the energy level radiated along the various radial lines from the reflector and hence indicate the directivity properties of the antenna and reflector. For the purposes of this specification, the beamwidth is taken as the angular width between the half-power points on each lobe. As is well known, the beamwidth of a microwave antenna of this type depends upon the reflector dimensions and the frequency of the radiated energy. The width of a 10,000 megacycle beam could be of the order of 3 to 8 degrees. For convenience, the frequency contemplated here is in the X band at or near 10,000 megacycles per second.

The two horns are fed through waveguides 12 and 13 from the hybrid junction 14. Waveguides 15 and 16 communicative directly with transmitters 17 and 18, respectively. Transmitters 17 and 18 may be of the magnetron type common in this art and may be identical in construction. However, in the embodiment of FIG. 1 the two transmitters differ only in tuned frequency. The frequency of transmitters 17 and 18 may, for example, be 9400 megacycles per second and 9375 megacycles per second, respectively. Transmitter 17 will hereinafter be called the "sum" transmitter and transmitter 18 will be hereinafter called the "difference" transmitter.

The hybrid junction 14 may be of the type described in "The Proceedings of the IRE," November 1947, page 1300 et seq. by W. A. Tyrrell. Such a hybrid junction, shown in greater detail in FIG. 3, comprises the horn feed waveguides 12 and 13 joined at their broad or flat side to the guide 16 of the difference transmitter 18. The other branch 15 of the junction, extending from the narrow side of the waveguide 12—13, connects directly with the sum transmitter 17. This compound junction of FIG. 2 possesses the properties required of a hybrid circuit. The arms 16 and 15, respectively, are balanced with respect to each other and act, electrically, as though they were in series and parallel, respectively, with the guides 12 and 13. The power delivered from either of guides 15 and 16 to the junction is equally divided between the loads presented by the antenna horns coupled to branches 12 and 13. This hybrid behavior is brought about by the geometrical symmetry prevailing in the region of the junction. Power entering branch 16 divides equally to the two antenna branches, the phase of the energy in branch 12 being 180 degrees out of phase with the energy in branch 13. However, energy introduced at branch 15, although equally divided between branches 12 and 13, supplies to the branches 12 and 13, and hence to the antenna loads, energies which are in phase with each other.

Figure 3:
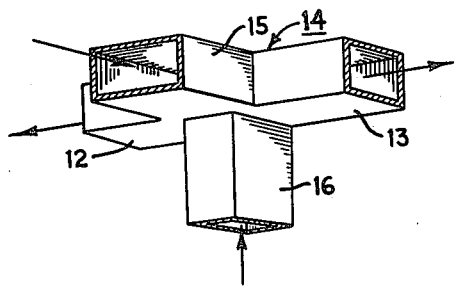
FIG. 3 is a perspective view of one type of hybrid waveguide junction that may be employed in this invention.
Figure 4:
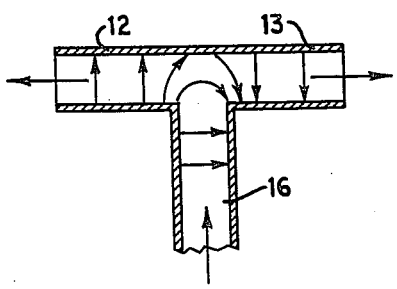
FIGS. 4 and 5 are two half-sectional views of the device of FIG. 3, FIGS. 6, 7, and 8 are graphs of radar signals, both transmitted and received, plotted against radar beam angular orientation.
Figure 5:
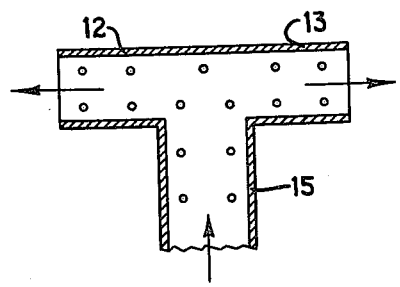

While the hybrid junction 14 of FIG. 3 is found to meet the electrical requirements of this system, other physical forms of the hybrid junction may be chosen for mechanical reasons. The vertical half-section of the waveguide of FIG. 3 including arms 12, 13 and 16 is shown in FIG. 4 with straight lines or arrows to represent the polarity of the electric field as the wave front moves in the waveguides. As the arrows reach the junction they bend, as shown in FIG. 4, and the direction of the arrows moving, respectively, to the left and to the right in waveguides 12 and 13 are reversed. The energy fed through guide 12 to the horn 10, hence, is 180 degrees out of phase with respect to the energy fed through guide 13. If now we take a horizontal half-section of the junction, as in FIG. 5, only the ends of the electric lines of force are seen, and it is apparent the energy entering waveguide 15 divides equally to the waveguides 12 and 13 but without reversal of phase. Hence, the energy radiated by the horns 10a and 10b, FIG. 1, is in phase from one transmitter and is out of phase from the other transmitter.

Figure 6:
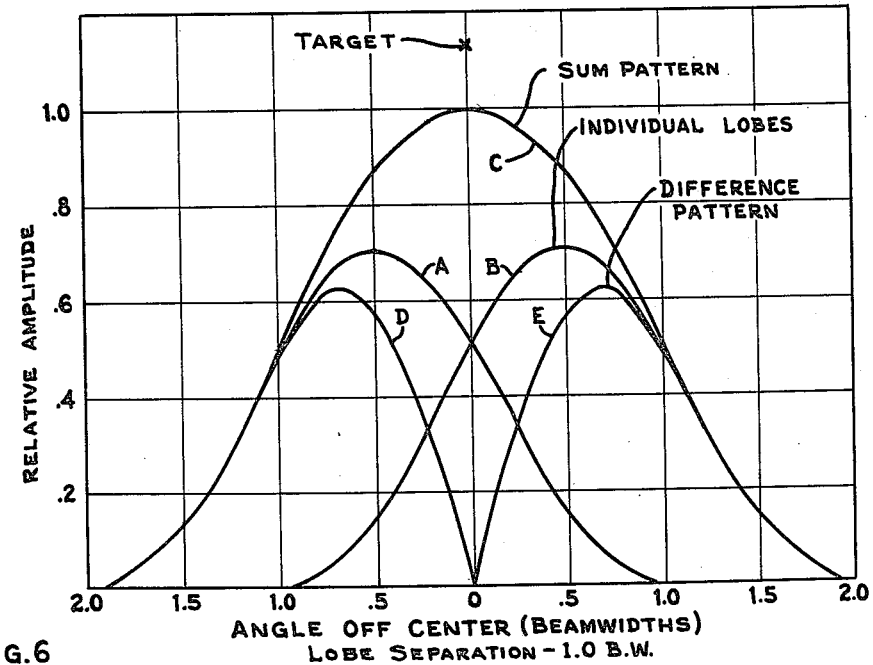

The significance of the phase relationship from the two horns supplied by the two transmitters will become apparent in the discussion hereinafter of the graphs of FIGS. 6, 7 and 8.

A receiver is connected to each input of the hybrid junction, FIG. 1. Receiver 19, which will be called the "sum" receiver is coupled through the crystal detector 20 and the transmit-receive box 21 to waveguide 15. The output of local oscillator 22 combines in detector 20 with signals received from the horns through waveguide 15 to produce an intermediate frequency acceptable to receiver 19. The conventional anti-transmit-receiver junction 23 prevents loss of received echo energy in the transmitter circuits while transmit-receiver box 21 protects the detector 20 and local oscillator 22 from possible damage from high powered pulses generated at transmitter 17.

The "difference" frequency receiver 25 is likewise coupled to the "difference" transmitter channel through detector 26 and transmit-receive box 27 to waveguide 16. The local oscillator 28 beats the received signal in the detector 26 to an intermediate frequency which may, if desired, be the same as the intermediate frequency in the "sum" channel. Anti-transmit-receiver junction 29 serves the usual function of properly terminating the waveguide 16 so that received video signals are not depleted in the transmitter circuits but are fed without attenuation to the receiver.

The two transmitters are pulsed from a common pulse source 30 so that the duration and frequency of the pulses of energy from the two transmitters are identical.

The amplified output of the "difference" receiver is subtracted from the amplified output of the "sum" receiver in the subtracter network 31 to produce the final video information displayed on the indicator 32. The indicator 32 may, for example, be a cathode ray tube with a long persistence screen adapted for PPI presentations and to the control grid of which is fed the output of the subtracter 31.

To analyze the system of FIG. 1 it is considered advisable to first look to the behavior of the "sum" transmitter 17 operating alone and to consider the echo signals reflected from a single point target. The in-phase energy radiated by horns 10a and 10b from transmitter 17 produces simultaneous lobes. Such a transmission may be termed monopulse. In FIG. 6 has been plotted the relative field amplitude of the lobes at the assumed target for different angular positions of the target. The angular positions have been measured in terms of fractions of a beamwidth. As stated above, a single beamwidth is assumed to be the angular width of the beam at the half-power points. The fields of the individual transmitter lobes are shaped as shown by curves A and B, while their sum is shown by curve C. During reception at the horns 10a and 10b of energy reflected from the single point target, the signal is received in both horns and in waveguides 12 and 13, but the relative magnitude of the signal in each arm is dependent upon the orientation of the reflecting target with respect to the antenna axis. If the signal returns from a point along the axis of the antenna, the signals in the two arms will be equal. If the target is located off the antenna axis one feed will receive a larger signal than the other. The two signals picked up by the feed horns are fed into the hybrid junction where they are both added and subtracted; the sum of the two signals emerges from arm 15 while the difference of the two signals emerges from arm 16. That is, the reciprocal of the actions at the junction, FIGS. 5 and 4, takes place when the directions of flow of energy are reversed. The signal in arm 15 is called the "sum" signal and the signal in arm 16 is called the "difference" signal. With the plot in FIG. 6 of the two antenna lobes A and B and their sum C is plotted the difference pattern D—E.

One important fact regarding the phase of the sum and difference signals should be noted. If the echo signal in guide 12 is greater in magnitude than the signal in guide 13, the difference signal will be in phase with the sum signal. If, however, the reverse condition exists, where the signal in guide 13 is greater than that in guide 12, the difference signal will be out of phase with the sum signal. If the two signals are equal, as in the case where the signals come from a point along the antenna axis, the difference signal is zero. This shift in phase of the difference signal with target position can and has been utilized for angle targeting purposes by comparing the sum and difference signals in a phase detector. The presence of this phase effect is of considerable significance as will presently appear.

Consider now two targets spaced, say, 1.4 beamwidths apart. The relative phases of the two echo signals received by the antenna will affect the resolution. If the two targets are spaced but 1.4 beamwidths apart the signal received at the antenna will be the vector sum of the individual returns from each target. At a conventional antenna, two signals of equal amplitude and 180 degrees relative phase, will produce a null or zero signal at the antenna. Hence, it is entirely possible for a conventional radar to separate two signals spaced this close together if the phase relationship of the two signals is such as to produce a decided null when the antenna is centered between the two targets, but such ideal conditions are seldom if ever realized in practice. The worst condition for obtaining resolution of course is when the returning signals are in phase. In airborne radar the phase of the returns is of a completely random nature due to the complexity of the targets and the movement of the aircraft. The in-phase, or worst, condition will now be considered in connection with the monopulse system employing only the sum transmitter of FIG. 1.

Figure 7:
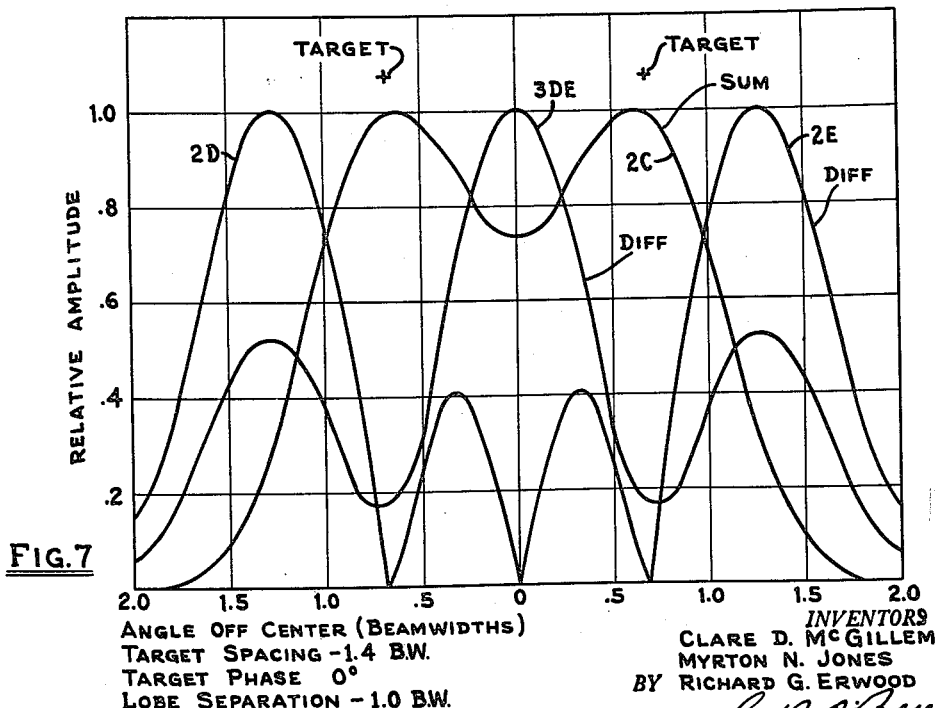

In FIG. 7 the received echo signals from two targets are plotted against antenna orientation. The target spacing is 1.4 beamwidths, lobe separation is 1.0 beamwidth, and the target phase is zero. The sum signal received in both horns 10 for various antenna orientations is represented by curve 2C. As expected, the sum signal ries to an indistinct maximum at each target with but a small decrease in sum signal level midway between the two targets. The plot of the difference signal shown by curve 2D—2E in FIG. 7 produces, as expected, zero detectable signal at each target. Unfortunately, the difference signal also drops to zero at the antenna position midway between the targets. Hence, when the difference signal is subtracted from the sum signal the valley in the 2C curve between the two targets is not deepened. That is, the difference signal, when subtracted from the sum signal does not improve the revolving power of the radar system.

According to an important feature of this invention the difference signal is made to rise to a relatively high finite value when the antenna points along a line midway between the targets. Assume now that both transmitters 17 and 18, FIG. 1, are put in operation and that the two targets of FIG. 7 are illuminated by the sum signal transmitted via waveguide 15, hybrid junction 14, and waveguides 12 and 13. In addition, assume that the targets also are illuminated by the difference signal transmitted via weveguide 16, hybrid junction 14, and waveguides 12 and 13. Now, the difference signal received back by the system of FIG. 1 and detected by receiver 25 is shown by the curve 3DE in FIG. 7. The large peak of curve 3DE midway between the targets, with two dips at the target positions, is precisely the type of difference signal pattern desired because, when subtracted in subtracter 31 from the sum patern 2C, it will produce the maximum resultant indication at the target positions and minimum indication midway between the targets. FIG. 7, further, suggests that the resolving power of the system can be increased by increasing the gain of the difference signal channel over the sum signal channel, and hence increasing the amplitude of the mid-point peak 3DE with respect to the amplitude of 2C.

Figure 8:
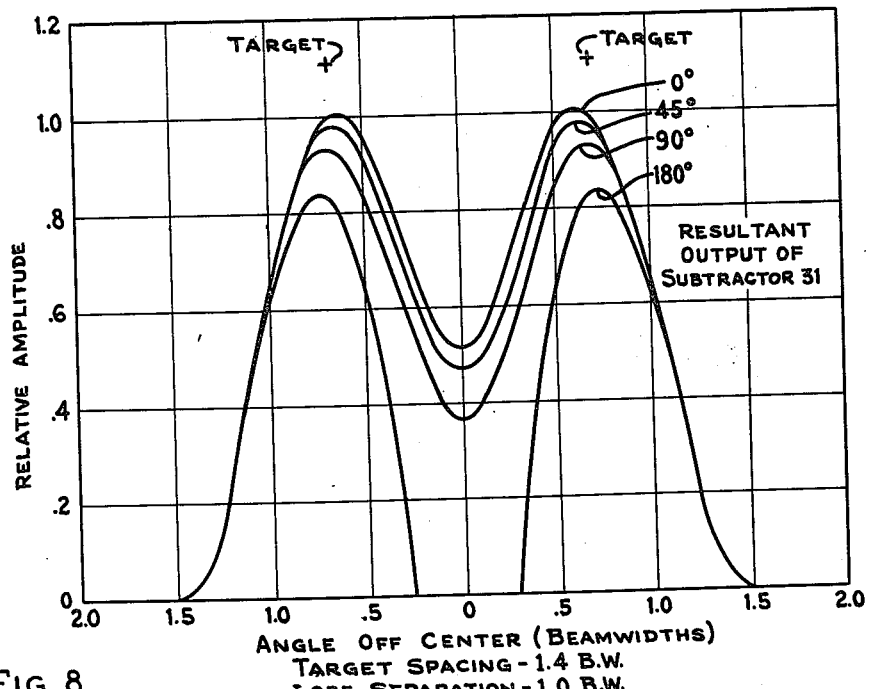

The resolving power of the system of FIG. 1 is demonstrated in the graphs of FIG. 8 where antenna position is plotted against the resultant output of subtracter 31. With a target separtion of 1.4 beamwidths and a lobe separation of 1.0 beamwidth, the on-target signals are each about twice the center-target signal even with the worst or zero phase condition of the two target signals. As the phases of the two target echo signals diverge to 45, 90 and 180 degrees, the resolving power of the system increases, as shown.

Figure 9:
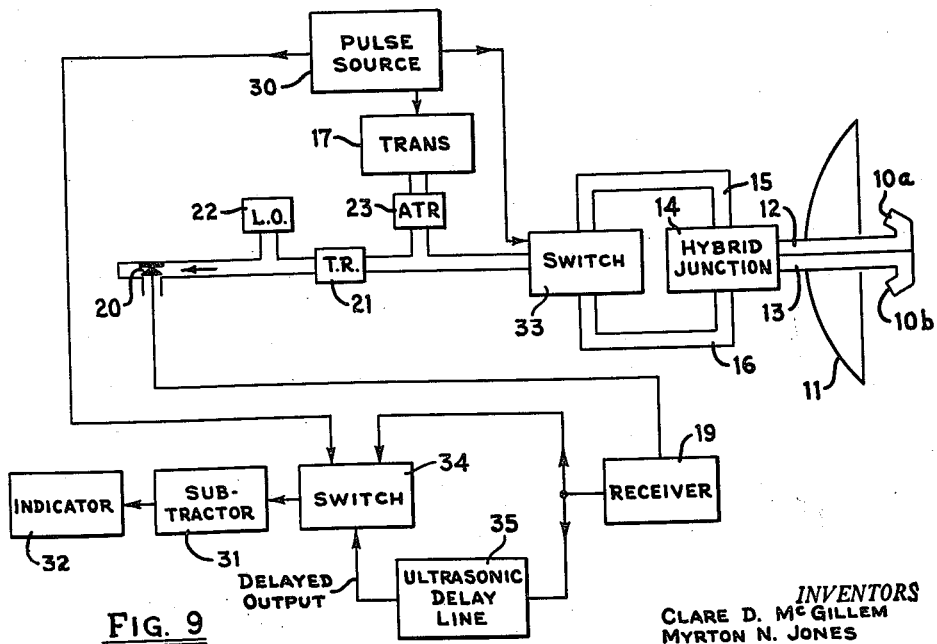
FIG. 9 is a block diagram of an alternative radar embodying this invention.

FIG. 9 shows an alternative embodiment of our novel radar system. In the circuits of FIG. 9 the sum and difference detected signals produced by the system of FIG. 1, are obtained with a single transmitter. Instead of distinguishing the sum and difference signals by two different carriers, the sum and difference signals are separated in time and are successively detected by the receiver. The parts numbered in FIG. 9 are similar in construction and function to similarly numbered parts in FIG. 1. The single transmitter 17, such as a magnetron, is triggered on and off by the pulse source 30, the output of the transmitter being conducted through the anti-transmit-receive device 23 through waveguides and through the switch 33 to the hybrid junction 14. The switch 33 conducts one pulse from the transmitter into waveguide 15 and hence to waveguides 12 and 13 to the antenna horns 10a and 10b. The radar energy in the two beams, produced by horns 10a and 10b, is in-phase just as in the case with FIG. 1. Immediately after the transmission of the in-phase pulse the switch 33 directs the transmitter output into waveguide 16 and hence into waveguides 12 and 13 to horns 10a and 10b, this latter energy being out of phase at the two horns. Various electronic or mechanical switches may be employed at 33 for successively switching one waveguide to two other waveguides. The switch per se is not claimed, and is not shown in detail. One switch which could be used is shown on pages 9–64 of "Principles of Radar" by Massachusetts Institute of Technology, published 1946 by McGraw-Hill, New York city. The two pulses for the in-phase and the out-phase transmission are preferably transmitted in rapid succession from the transmitter under the control of the pulse source 30. A simple multivibrator, for example, may be employed for successively triggering the transmitter 17 and switching switch 33. From a single target, two echo signals are received in rapid succession, and are conducted respectively through the sum waveguide 15 and the difference waveguide 16 to the detector 20 where the two signals are mixed with the output of the local oscillator 22. The resulting intermediate frequency is amplified and detected at receiver 19 and the two successively detected pulses are applied in parallel to the switch 34 and to the ultrasonic delay line 35. Switch 34 is synchronized with the switch 33 so that the first of the two received signals encounters an open circuit at 34 and is directed through the delay line. At the instant the delayed signal emerges from the delay line, the switch 34 closes the circuit between the output of receiver 19 and the input to the subtracter 31 so that the early and late signals arrived at the subtracter at the same time. Thus, the two signals may then be compared and their resultant applied to the indicator 32. The benefits of the high center difference signal, 3DE of FIG. 7, are obtained. The difference signal may be disproportionately amplified if desired in the delay leg of the bridge of FIG. 9 to heighten the midpoint 3DE and to deepen the valley of the resultant signal, FIG. 8, between the two targets. The circuit of FIG. 9, like the circuit of FIG. 1, effectively eliminates false targets on radar presentation screens and clearly defines closely spaced targets.

Many modifications may be made in the circuits of this invention without departing from the spirit of the invention, nor from the scope of the appended claims.

What is claimed is:

1. In combination in a radar system, a first high frequency transmitter and a second high frequency transmitter, a directional antenna with two feed devices symmetrically displaced from the centerline of the antenna to produce two lobes of radiant energy, a hybrid junction coupled respectively with said first and second transmitter, and with said two antenna feed devices, a first receiver coupled to the coupling of the first transmitter, a second receiver coupled to the coupling of the second transmitter, and means for comparing the outputs of said receivers.

2. A radar system comprising a first and a second radar transmitter, a first radiator with means for confining radiation to a relatively narrow beam, a second radiator with means for confining radiation to a relatively narrow beam, the said beams being partially overlapped and relatively angularly displaced, means coupling the said first and second transmitters to each of the said radiators, the said means including further means simultaneously feeding in-phase and phase-opposed energy to the said radiators, first and second radiant energy receivers coupled to said radiators and responsive selectively to the energies of the respective transmitters reflected to the radiators from a reflecting object in said beams, and means for subtracting the output of one receiver from the output of the other receiver.

3. A radar system for resolving the echo signals from a plurality of closely spaced targets comprising a reflector, two radiators symmetrically displaced on either side of a median centerline of the reflector to produce two slightly angularly displaced beams, transmitter means for feeding both in-phase and out-of-phase radiant energy pulses to the two radiators, and receiver means for detecting all echo signals reflected to the two radiators from a plurality of closely spaced targets in said beams, a hybrid junction coupling the transmitter means and the receivers to the two radiators so that one receiver is selectively responsive only to the in-phase signals from the targets and the other receiver is selectively responsive only to the out-of-phase signals received from said targets, and means for subtracting the output of one receiver from the output of the other receiver, and an indicator coupled to the subtracting means.

4. A high-resolution radar system comprising: a directional antenna including means for radiating and receiving the high frequency energy of two distinct slightly diverging field pattern lobes, first means for feeding in-phase high-frequency energy to the said directional antenna to produce a sum echo signal from reflecting objects, a first receiver associated with the said first means for accepting the sum echo signals received at the antenna, a second means for feeding out-of-phase high-frequency energy to the said directional antenna such that one of the said lobes contains energy out-of-phase with energy in the other lobe, a second receiver associated with the said second means for accepting the difference echo signals received at the antenna, and means for comparing the two received signals.

5. A radar system comprising a directional antenna and reflector assembly having two feed horns displaced respectively on opposite sides of the median centerline of the reflector, first means connected with said horns for radiating high frequency in-phase radar pulses from both horns, second means connected with said horns for radiating high-frequency radar pulses from one of the said horns out-of-phase with energy radiated from the other of the said horns, and means for separately accepting and comparing the in-phase and out-of-phase echo signals received by the said horns.

6. A radar system comprising means for radiating two diverging radiant energy beams, a radiant energy generator, a hybrid junction coupled between the generator and the radiating means for feeding in-phase and out-of-phase radiant energy to the said radiating means, receiver means coupled to the radiating means for separately detecting in-phase and out-of-phase signals reflected from targets illuminated by the two beams, and means for comparing the amplitudes of the in-phase signals with the out-of-phase signals.

7. A high-resolution radar system for discriminating a multiplicity of closely-spaced targets comprising: means generating high-frequency energy; means coupled to the said generating means for translating at least a portion of the said energy into two out-of-phase components and the remainder of the said energy into two in-phase components; means coupled to the said translating means for radiating the said out-of-phase and in-phase energy in two lobes; means coupled to the said radiating means for receiving reflected energy; and means for comparing the said in-phase and out-of-phase components of the reflected energy.

8. A high-resolution radar system for discriminating a multiplicity of closely-spaced targets comprising: a source of radiant energy; means coupled to the said source for translating the said energy into in-phase and out-of-phase components; means coupled to the said translating means for alternately radiating the said in-phase and out-of-phase components; means for receiving the in-phase and out-of-phase components of reflected energy; and means for comparing the received in-phase and out-of-phase components.

9. A radar system as represented in claim 8 wherein the said translating means comprises a hybrid junction having, with respect to the transmitter, two input channels and two output channels.

10. A radar system as represented in claim 9 wherein the said means for alternately radiating comprises a directional antenna having two radiating horns coupled to the said output channels of the hybrid junction; and said source of radiant energy includes a source of time-spaced pulses with means responsive to the said time-spaced pulses for coupling the said source of radiant energy alternately to a different one of the said two input channels of the hybrid junction.

11. A radar system as represented in claim 10 wherein the said comparing means comprises: a subtracter; means coupled between the said receiving means and the said subtracter for delaying alternate pulses sufficiently to bring each alternate pulse into time coincidence with the preceding pulse; and a radar display unit coupled to the said subtracter.

References Cited in the file of this patent
UNITED STATES PATENTS

| | | |
|---|---|---|
| 2,585,173 | Riblet | Feb. 12, 1952 |
| 2,682,656 | Phillips | June 29, 1954 |
| 2,687,520 | Fox et al. | Aug. 24, 1954 |
| 2,730,710 | Loeb | Jan. 10, 1956 |